US012620253B2

(12) United States Patent    (10) Patent No.:   US 12,620,253 B2
Lee et al.    (45) Date of Patent:    May 5, 2026

(54) METHOD FOR RECOGNIZING HUMAN BODY AREA IN IMAGE, ELECTRONIC DEVICE, AND STORAGE MEDIUM

(71) Applicant: HON HAI PRECISION INDUSTRY CO., LTD., New Taipei (TW)

(72) Inventors: Wan-Jhen Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 455 days.

(21) Appl. No.: 18/109,541

(22) Filed: Feb. 14, 2023

(65) Prior Publication Data

US 2024/0193980 A1     Jun. 13, 2024

(30) Foreign Application Priority Data

Dec. 10, 2022    (CN) .......................... 202211585080.2

(51) Int. Cl.
| | |
|---|---|
| *G06V 40/10* | (2022.01) |
| *G06T 7/62* | (2017.01) |
| *G06V 10/26* | (2022.01) |
| *G06V 10/77* | (2022.01) |
| *G06V 10/776* | (2022.01) |

(52) U.S. Cl.
CPC ................ *G06V 40/10* (2022.01); *G06T 7/62* (2017.01); *G06V 10/26* (2022.01); *G06V 10/7715* (2022.01); *G06V 10/776* (2022.01)

(58) Field of Classification Search
CPC .... G06V 40/10; G06V 10/26; G06V 10/7715; G06V 10/776; G06V 40/103; G06V 20/58; G06V 10/759; G06T 7/11; G06T 2207/30196; G06T 7/70; G06T 2207/10028; G06T 7/13; G06T 2207/20081; G06T 7/62; G06F 18/00
See application file for complete search history.

(56) References Cited

U.S. PATENT DOCUMENTS

| | | | | |
|---|---|---|---|---|
| 2002/0150308 A1* | 10/2002 | Nakamura | ............. | H04N 23/71 |
| | | | | 396/234 |
| 2019/0340773 A1* | 11/2019 | Cao | .......................... | G06F 3/017 |
| 2022/0270387 A1* | 8/2022 | Bai | .......................... | G06T 17/00 |

FOREIGN PATENT DOCUMENTS

| | | | | |
|---|---|---|---|---|
| CN | 111273698 B | * | 11/2020 | |
| CN | 113361491 A | * | 9/2021 | ....... G06F 18/23213 |
| CN | 113792615 A | * | 12/2021 | |
| TW | I648985 | | 1/2019 | |

* cited by examiner

*Primary Examiner* — John Villecco
*Assistant Examiner* — Kyla Guan-Ping Tiao Allen
(74) *Attorney, Agent, or Firm* — ScienBiziP, P.C.

(57)      ABSTRACT

A method for recognizing human body area in image, an electronic device and a storage medium are provided. In the method, a human body area corresponding to a person in an image is recognized and the human body area is divided into a plurality of target areas according to a height of the human body area and a preset height ratio. A plurality of widths corresponding to the plurality of the target areas are acquired, and a first target width change relationship is determined. When the first target width change relationship does not match a preset standard width change relationship, the human body area is determined to be incomplete. The method can improve an accuracy of a human body area in an image recognition.

14 Claims, 6 Drawing Sheets

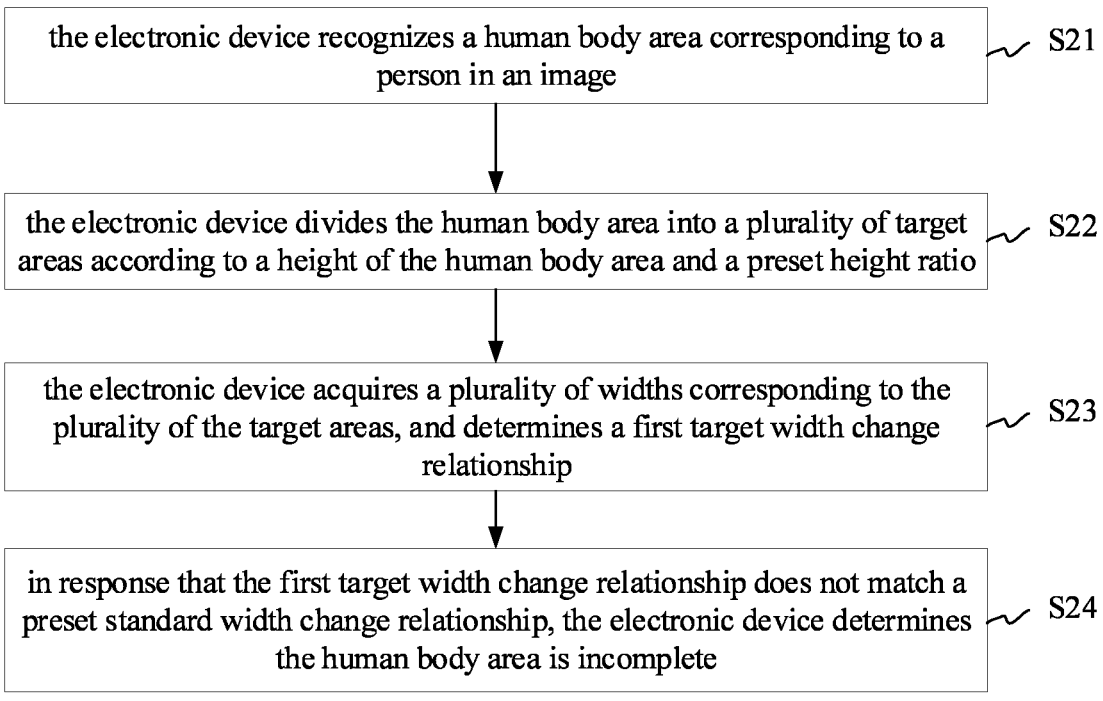

the electronic device recognizes a human body area corresponding to a person in an image    S21 the electronic device divides the human body area into a plurality of target areas according to a height of the human body area and a preset height ratio    S22 the electronic device acquires a plurality of widths corresponding to the plurality of the target areas, and determines a first target width change relationship    S23 in response that the first target width change relationship does not match a preset standard width change relationship, the electronic device determines the human body area is incomplete    S24

FIG. 2

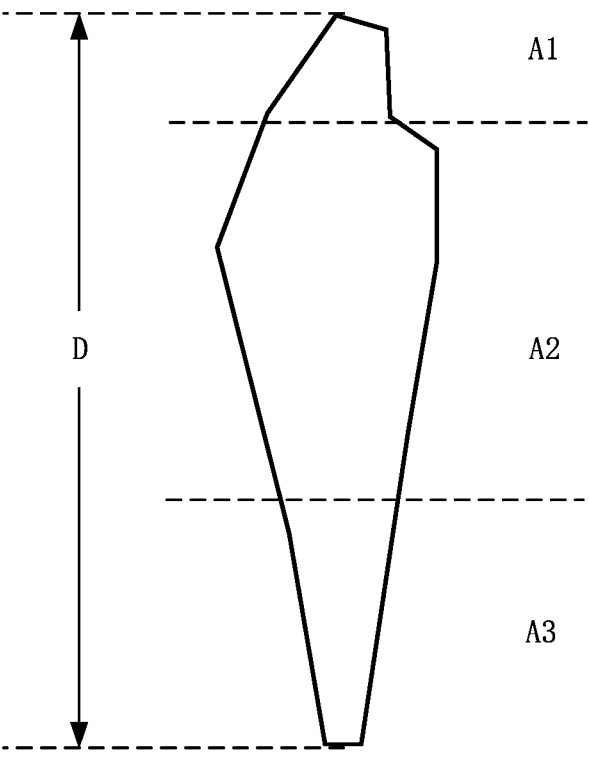

FIG. 3

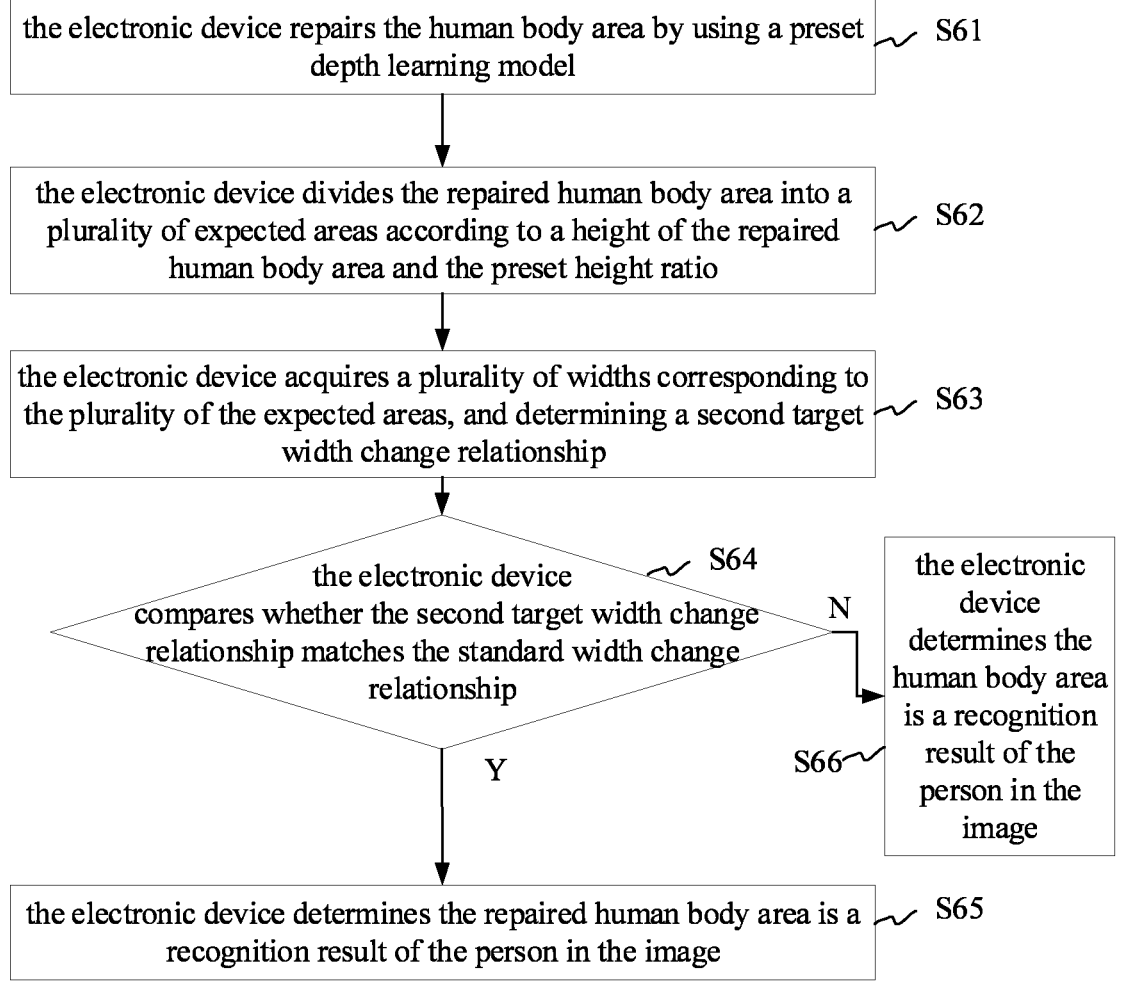

the electronic device repairs the human body area by using a preset depth learning model  S61 the electronic device divides the repaired human body area into a plurality of expected areas according to a height of the repaired human body area and the preset height ratio  S62 the electronic device acquires a plurality of widths corresponding to the plurality of the expected areas, and determining a second target width change relationship  S63 the electronic device compares whether the second target width change relationship matches the standard width change relationship  S64

N the electronic device determines the human body area is a recognition result of the person in the image  S66

Y the electronic device determines the repaired human body area is a recognition result of the person in the image  S65

FIG. 6

METHOD FOR RECOGNIZING HUMAN BODY AREA IN IMAGE, ELECTRONIC DEVICE, AND STORAGE MEDIUM

FIELD

The present application relates to a technical field of image recognition, specifically a method for recognizing human body area in image, an electronic device and a storage medium.

BACKGROUND

In a process of vehicle driving, pedestrians, being viewed as one of the many vehicle obstacles, need to be accurately recognized and avoided to avoid danger to pedestrians. Usually, target detection technologies, that is, neural network models, are used to detect pedestrians. However, training the neural network models requires a lot of computing power and computation time, and the training of the neural network models can only be conducted periodic. Therefore, if the training and updating of the neural network models is insufficient, it may lead to inaccurately recognize pedestrians on the roads, and result in traffic accidents.

BRIEF DESCRIPTION OF THE DRAWINGS

FIG. 2 shows a flowchart of a method for recognizing human body area in image provided in an embodiment of the present disclosure.

FIG. 3 shows a schematic diagram of dividing a human body area provided in an embodiment of the present disclosure.

FIG. 6 shows a flowchart of a method for repairing an incomplete human body area provided in an embodiment of the present disclosure.

DETAILED DESCRIPTION

The accompanying drawings combined with the detailed description illustrate the embodiments of the present disclosure hereinafter. It is noted that embodiments of the present disclosure and mapped features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

In order to solve a technical problem of inaccurate human body area recognition in image based pedestrian recognition, and better understand a method for recognizing human body area in image, an electronic device and a storage medium provided in an embodiment of the present disclosure, an application scenario of the method for recognizing human body area in image of is described below.

Figure 1:
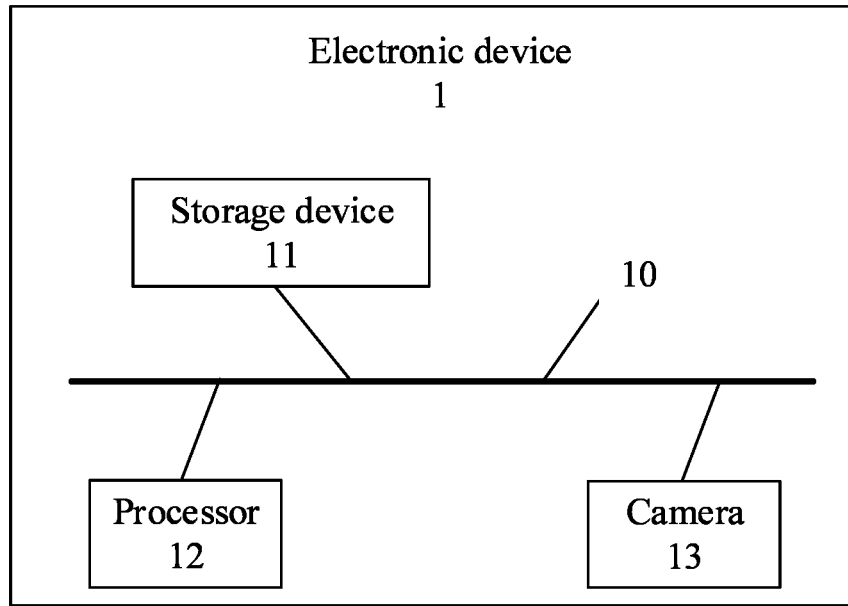
FIG. 1 shows a schematic structural diagram of an electronic device in one embodiment of the present disclosure.

FIG. 1 is a schematic structural diagram of an electronic device provided in an embodiment of the present disclosure. The method for recognizing human body area in image provided in an embodiment of the present disclosure is applied to an electronic device 1, which includes, but is not limited to, a storage device 11, at least one processor 12, and a camera 13. The storage device 11, the at least one processor 12 and the camera 13 are connected to each other through a communication bus 10. The camera 13 can be an on-board camera of a vehicle, a camera of an external vehicle, such as a camera or a tachograph, to capture images or videos in front of a vehicle.

In an embodiment of the present disclosure, the electronic device 1 can be applied to vehicles, for example, an on-board device in a vehicle (for example, a vehicle machine), or an independent on-board device (for example, a computer, a laptop, a mobile phone, etc.). The electronic device 1 can communicate and interact with the on-board device to achieve a control of the vehicle.

The storage device 11 stores computer-readable instructions, for example, recognizing pedestrian programs, and the computer-readable instructions can be executed on the at least one processor 12. The processor 12 executes the computer-readable instructions to implement the steps in the embodiment of the method for recognizing human body area in image, such as in steps in block S21-S24 shown in FIG. 2, or in steps in block S61-S66 shown in FIG. 6.

For example, the computer-readable instructions can be divided into one or more modules/units, and the one or more modules/units are stored in the storage device 11 and executed by the at least one processor 12. The one or more modules/units can be a series of computer-readable instruction segments capable of performing specific functions, and the instruction segments are used to describe execution processes of the computer-readable instructions in the electronic device 1.

The electronic device 1 can be an electronic device such as a desktop computer, a notebook, a palmtop computer, and a cloud server. Those skilled in the art will understand that the schematic diagram 1 is only an example of the electronic device 1 and does not constitute a limitation on the electronic device 1. Another electronic device 1 may include more or fewer components than shown in the figures or may combine some components or have different components. For example, the electronic device 1 may further include an input/output device, a network access device, a bus, and the like.

The at least one processor 12 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 12 can be a microprocessor or any conventional processor. The processor 12 is a control center of the electronic device 1 and connects various parts of the entire electronic device 1 by using various interfaces and lines.

The storage device 11 can be configured to store the computer-readable instructions and/or modules/units. The processor 12 may run or execute the computer-readable instructions and/or modules/units stored in the storage device 11 and may call up data stored in the storage device 11 to implement various functions of the electronic device 1. The storage device 11 mainly includes a storage program area and a storage data area. The storage program area may store an operating system, and an application program required for at least one function (such as a sound playback function, an image playback function, etc.), etc. The storage data area may store data (such as audio data, phone book data, etc.) created according to the use of the electronic device 1. In addition, the storage device 11 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

When the modules/units integrated into the electronic device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

In the several embodiments provided in the preset application, the disclosed electronic device and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

Optionally, the method for recognizing human body area in image of the present disclosure can be applied to one or more electronic devices. Such electronic device includes hardware such as, but not limited to, a microprocessor and an Application Specific Integrated Circuit (ASIC), Field-Programmable Gate Array (FPGA), Digital Signal Processor (DSP), embedded devices, etc.

The electronic device may be a device such as a desktop computer, a notebook, a palmtop computer, or a cloud server. The electronic device can interact with users through a keyboard, a mouse, a remote control, a touch panel, or a voice control device.

FIG. 2 is a flowchart of a method for recognizing human body area in image in an embodiment of the present disclosure. The method for recognizing human body area in image is applied to an electronic device. According to different needs, the order of the steps in the flowchart can be changed, and some can be omitted.

In block S21, the electronic device recognizes a human body area corresponding to a person in an image.

In an embodiment of the present disclosure, one or more images can be captured by using a camera (for example, a monocular camera), and the captured one or more images are RGB images.

The captured image can be inputted into a preset neural network model, a person in the captured image can be recognized through the preset neural network model, and the recognized person can be covered with a mask. Mask is also called masking, which means to mask the image (all or part) to be processed with a selected image, a figure or an object.

The area corresponding to the person in the image covered by the mask is taken as the human body area. When there is a plurality of persons in an image, a plurality of human body areas can be acquired simultaneously, and different human body areas can be covered with different masks. One person corresponds to one human body area.

The preset neural network model can be trained based on one or more of a long-short term memory (LSTM), a recurrent neural network (RNN) and a convolutional neural network (CNN). In some examples, the preset neural network model can be an instance segmentation model, which can segment instances of different objects; the different objects can be different persons.

In block S22, the electronic device divides the human body area into a plurality of target areas according to a height of the human body area and a preset height ratio.

In an embodiment of the present disclosure, after the human body area is recognized, the height of the human body area can be obtained, and the human body area can be divided according to the height of the human body area. The human body area can be divided into a plurality of target areas according to the height of the human body area and the preset height ratio.

The height of the human body area can be determined according to the mask. For example, a distance between a horizontal line where a highest point of the mask is located and a horizontal line where a lowest point of the mask is located in the image can be determined as the height of the human body area.

In some embodiments, the electronic device divides the human body area into a plurality of target areas according to a height of the human body area and a preset height ratio includes dividing the human body area into a first target area, a second target area and a third target area according to the height of the human body area and the preset height ratio.

A height of the first target area is less than a height of the second target area and a height of the third target area; and the height of the second target area is larger than the height of the third target area.

The height of the target area (e.g., the first target area, the second target area, the third target area) can be determined according to a distance between a horizontal line where a highest point of the target area is located and a horizontal line where a lowest point of the target area is located in the image.

As shown in FIG. 3, assuming that the preset height ratio is 2:5:3, the human body area is divided into three target areas, such as a first target area A1, a second target area A2 and a third target area A3, based on the height D of the human body area and the preset height ratio 2:5:3. A height of the first target area A1 is 2/10 of the height D of the human body area, and a height of the second target area A2 is 5/10 of the height D of the human body area, a height of the third target area A3 is 3/10 of the height D of the human body area. Obviously, a height of the first target area A1 is less than a height of the second target area A2 and a height of the third target area A3, and a height of the second target area A2 is greater than a height of the third target area A3.

In another embodiment, the preset height ratio can also be set as 2:6:2, that is, the heights of the first target area A1 and the third target area A3 are the same and both of the heights are 2/10 of the height D of the human body area. The height of the first target area A1 and the third target area A3 are less than the height of the second target area A2, the height of the second target area A2 is 6/10 of the height D of the human body area.

Figure 4:
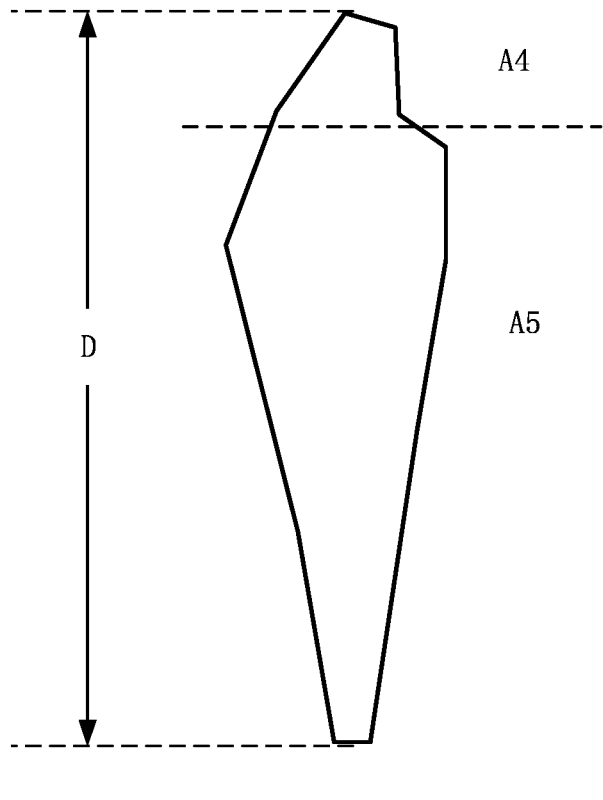
FIG. 4 shows a schematic diagram of dividing a human body area provided in another embodiment of the present disclosure.

As shown in FIG. 4, suppose that the human body area is divided into two target areas, which include a first target area A4 and a second target area A5. The preset height ratio can be set to 2:8 in advance. Based on the height of the human body area and the preset height ratio 2:8, the first target area A4 and the second target area A5 can be obtained. A height of the first target area A4 is 2/10 of the height of the human body area, and a height of the second target area A5 is 8/10 of the height of the human body area.

The above embodiments are just illustrative examples. In practical applications, the human body area can also be divided into four or more target areas, and the preset height ratio can also be adjusted according to actual needs, which is not limited by the embodiments of the present disclosure.

In block S23, the electronic device acquires a plurality of widths corresponding to the plurality of the target areas and determines a first target width change relationship.

In the embodiment of the present disclosure, after the human body area is divided into the plurality of the target areas, the width of each target area is acquired. The width of each target area can be acquired in a same direction. The width of each target area is a widest distance of each target area in the same direction. In other embodiments, the width of each target area can also be obtained by using target detection algorithms. Specifically, target detection algorithms are used to detect edges of each target area to obtain edge contours, a distance between a vertical line of a leftmost point of the edge contours and a vertical line of a rightmost point of the edge contours is calculated, and the calculated distance is determined as the width of the target area.

Figure 5:
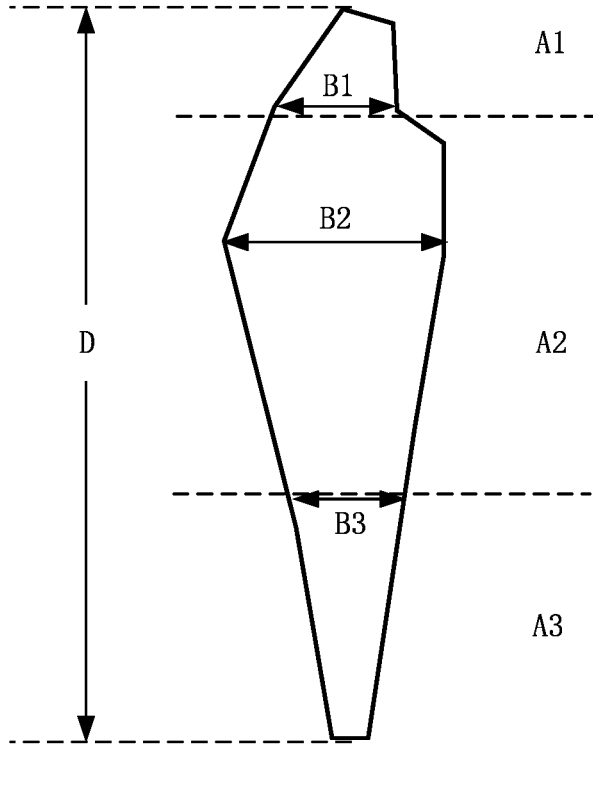
FIG. 5 shows a schematic diagram of a width of a target area provided in an embodiment of the present disclosure.

As shown in FIG. 5, according to the preset height ratio, such as 2:5:3, the human body area is divided into the first target area A1, the second target area A2, and the third target area A3. Widths B1, B2, and B3 are obtained by acquiring a width of the first target area A1, a width of the second target area A2, and a width of the third target area A3 in the same direction.

According to the width of the first target area, the width of the second target area and the width of the third target area, the first target width change relationship can be determined. Specifically, by comparing the width of the first target area, the width of the second target area and the width of the third target area, the width changes from the width of the first target area to the width of the second target area and then to the third width can be obtained. This trend of width change is called the first target width change relationship.

For example, suppose that the height B1 of the first target area A1 is 2 mm, the height B2 of the second target area A2 is 15 mm, and the height B3 of the third target area A3 is 7 mm, so the trend of width change is 2 mm→15 mm→7 mm. The first target width change relationship is, from a first small width to a large width, and then to a second small width, and the first small width is smaller than the second small width.

For another example, suppose that the human body area is divided into two target areas divided, including the first target area A1 and the second target area A2, the height B1 of the first target area A1 is 2 mm, and the height B2 of the second target area A2 is 15 mm, so the trend of width change is 2 mm→15 mm. The first target width change relationship is, from a small width to a large width.

In block S24, in response that the first target width change relationship does not match a preset standard width change relationship, the electronic device determines the human body area is incomplete.

In the embodiment of the present disclosure, before comparing the first target width change relationship with the preset standard width change relationship, the standard width change relationship is acquired by analyzing test images.

The standard width change relationship is determined by: acquiring test images of a plurality of testers; inputting each test image into a preset recognition model to obtain a human body area of each tester; dividing the human body area of each tester, taking an area corresponding to a head of each tester as a first test area, taking an area corresponding to an upper body of each tester as a second test area, and taking an area corresponding to a lower body of each tester as a third test area; acquiring a width of the first test area, a width of the second target area and a width of the third test area; determining the standard width change relationship, based on the width of the first test area, the width of the second target area and the width of the third test area.

In some embodiments, test images of a plurality of testers can be obtained. Each tester can correspond to one or more test images. A proportion of a human body area corresponding to the tester in each test image can be the same or different.

In one embodiment, the second test area does not include the area corresponding to the head.

The width of the first test area, the width of the second target area and the width of the third test area are obtained in the same direction. A widest distance in the first test area is selected as the width of the first test area, a widest distance in the second target area is selected as the width of the second target area, and a widest distance in the third test area is selected as the width of the third test area.

For example, assuming that the width of the first test area is 2 mm, the width of the second target area is 15 mm, and the width of the third test area is 7 mm, the standard width change relationship is from the width of the first test area to the width of the second target area, and then from the width of the second target area to the width of the third test area. Since the width of the first test area is smaller than that of the second target area and that of the third test area, and the width of the second target area is larger than that of the third test area, the standard width change relationship is from small to lager, and then to small.

In other embodiments, the human body area can be divided into a first test area including a head and a second target area not including a head. After obtaining the width of the first test area and the width of the second target area, the standard width change relationship can be determined according to the width of the first test area and the width of the second target area. For example, if the width of the first test area is 2 mm and the width of the second target area is 15 mm, the standard width change relationship is from a small width to a large width.

The above is just examples. The human body area of each tester can be divided into a plurality of test areas according to actual needs, and the corresponding standard width change relationship can be determined according to the width of the plurality of test areas.

After determining the standard width change relationship, the first target width change relationship is compared with the standard width change relationship to obtain a comparison result. According to the comparison result, whether the human body area includes the head area and whether the recognized person is a complete are determined. When the comparison result shows that the first target width change relationship does not match the standard width change relationship, it indicates that the human body area does not include the head area, and then it is determined that the human body area in the image is incomplete. When the comparison result is that the first target width change relationship matches the standard width change relationship, it indicates that the human body area includes the head area, and then it is determined that the human body area in the image is complete.

In some embodiments, when the width of the first target area is greater than or equal to the width of the second target area, and the width of the first target area is greater than the width of the third target area, it is determined that the first target width change relationship does not match the preset standard width change relationship. When the width of the first target area is less than the width of the second target area and the width of the third target area, and the width of the second target area is larger than the width of the third target area, it is determined that the first target width change relationship matches the preset standard width change relationship.

After determining that the human body area in the image is incomplete, the incomplete human body area in the image can be repaired.

FIG. 6 is a flowchart of a method for repairing an incomplete human body area provided in an embodiment of the present disclosure. The method for repairing an incomplete human body area is applied to an electronic device. According to different needs, the order of the steps in the flowchart can be changed, and some can be omitted.

In block S61, the electronic device repairs the human body area by using a preset depth learning model.

In the embodiment of the present disclosure, since pixels of the person are inconsistent with those of surrounding environment, that is, brightness information of the person is inconsistent with that of the surrounding environment; the preset depth learning model can be used to repair the human body area. Specifically, by combining the Encoder Decoder network structure and Generative Adversarial Networks (GAN), a L2 Loss Function and an adversary Loss Function are used to modify the image. The Encoder Decoder structure is used to learn global image features, which include color features, texture features and shape features. The GAN is used to correct the loss of the image based on the global image features, so as to determine whether the repaired image is consistent with the preset standard image.

Figure 7:
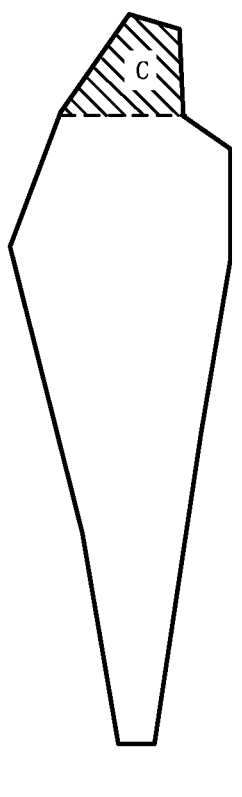
FIG. 7 shows a schematic diagram of a repaired human body area provided in an embodiment of the present disclosure.

FIG. 7 is a schematic diagram of the repaired human body area provided by the embodiment of the present disclosure, as shown in FIG. 7, and a repaired area is shown in Part C of FIG. 7.

In block S62, the electronic device divides the repaired human body area into a plurality of expected areas according to a height of the repaired human body area and the preset height ratio.

In the embodiment of the present disclosure, the height ratio can be set in advance. According to the height of the repaired human body area and the preset height ratio, the repaired human body area can be divided into a plurality of expected areas.

In some embodiments, wherein dividing the repaired human body area into a plurality of expected areas according to a height of the repaired human body area and the preset height ratio includes dividing the repaired human body area into a first expected area, a second expected area and a third expected area according to the height of the repaired human body area and the preset height ratio.

Wherein a height of the first expected area is less than a height of the second expected area and a height of the third expected area; the height of the second expected area is larger than the height of the third expected area.

For example, suppose that the preset height ratio is 2:5:3, and the repaired human body area is divided into a first expected area, a second expected area and a third expected area. Wherein a height of the first expected area is 2/10 of the repaired human body area, a height of the second expected area is 5/10 of the repaired human body area, and a height of the third expected area is 3/10 of the repaired human body area. Obviously, the height of the first expected area is less than that of the second expected area and that of the third expected area, and the height of the second expected area is higher than that of the third expected area.

In block S63, the electronic device acquires a plurality of widths corresponding to the plurality of the expected areas and determines a second target width change relationship.

In some embodiments, a width of the first expected area, a width of the second expected area and a width of the third expected area can be obtained by using the target detection algorithm.

By comparing the width of the first expected area, the width of the second expected area and the width of the third expected area, the second target width change relationship can be determined.

For example, if the width of the first expected area is 2 mm, the width of the second expected area is 15 mm, and the width of the third expected area is 7 mm, the second target width change relationship is from a small width to a large width, and then to a small width, and the width of the first expected area is less than the width of the third expected area.

In block S64, the electronic device compares whether the second target width change relationship matches the standard width change relationship.

In order to determine whether the repaired human body area matches expectations, the second target width change relationship is compared with the standard width change relationship. The standard width change relationship can refer to the above step S24 and will not be described here again.

In block S65, when the second target width change relationship matches the standard width change relationship, the electronic device determines the repaired human body area is a recognition result of the person in the image.

When the width of the first expected area is less than the width of the second expected area, and the width of the second expected area is greater than the width of the third expected area, the second target width change relationship determining matches the preset standard width change relationship.

For example, assuming that the width of the first expected area is 2 mm, the width of the second expected area is 15 mm, and the width of the third expected area is 7 mm, since the width of the first expected area is less than the width of the second expected area, and the width of the second expected area is greater than the width of the third expected area, the second target width change relationship matches the standard width change relationship. The repaired human body region is taken as a recognition result of the person in the image.

In block S66, when the second target width change relationship does not match the standard width change relationship, the electronic device determines the human body area is a recognition result of the person in the image.

For example, assuming that the width of the first expected area is 15 mm, the width of the second expected area is 12 mm, and the width of the third expected area is 7 mm, since the width of the first expected area is greater than the width of the second expected area, and the width of the second expected area is greater than the width of the third expected area, the second target width change relationship does not match the standard width change relationship. The repaired human body area is not as expected. The human body area before repaired is taken as a recognition result of the person in the image.

Assuming that the first expected area in the repaired human body area includes the head area of the person, according to the standard width change relationship, the width of the first expected area should be less than the width of the second expected area. If the width of the first expected area is greater than the width of the second expected area, it indicates that the repaired human body area does not match the human proportion.

By setting a standard width change relationship in advance, the present disclosure divides the human body area into a plurality of target areas, and obtains the width of each target area, so as to obtain the target width change relationship according to the width of each target area. Then, by comparing the obtained target width change relationship with the standard width change relationship, it determines whether the human body area is complete, which improves the accuracy of person recognition, and avoids incomplete grasping of human body area. When the present disclosure is applied to a field of vehicle driving, an accuracy of pedestrian recognition can be improved, thereby improving safeties of vehicle driving.

The embodiment also provides a non-transitory readable storage medium having computer-readable instructions stored therein. The computer-readable instructions are executed by a processor to implement the steps in the above-mentioned image processing method, such as in steps in blocks S21-S24 shown in FIG. 2:

In block S21, the electronic device recognizes a human body area corresponding to a person in an image;

In block S22, the electronic device divides the human body area into a plurality of target areas according to a height of the human body area and a preset height ratio;

In block S23, the electronic device acquires a plurality of widths corresponding to the plurality of the target areas, and determines a first target width change relationship;

In block S24, in response that the first target width change relationship does not match a preset standard width change relationship, the electronic device determines the human body area is incomplete.

The embodiment also provides a non-transitory readable storage medium having computer-readable instructions stored therein. The computer-readable instructions are executed by a processor to implement the steps in the above-mentioned image processing method, such as in steps in blocks S61-S66 shown in FIG. 6:

In block S61, the electronic device repairs the human body area by using a preset depth learning model;

In block S62, the electronic device divides the repaired human body area into a plurality of expected areas according to a height of the repaired human body area and the preset height ratio;

In block S63, the electronic device acquires a plurality of widths corresponding to the plurality of the expected areas, and determining a second target width change relationship;

In block S64, the electronic device compares whether the second target width change relationship matches the standard width change relationship;

In block S65, when the second target width change relationship matches the standard width change relationship, the electronic device determines the repaired human body area is a recognition result of the person in the image;

In block S66, when the second target width change relationship does not match the standard width change relationship, the electronic device determines the human body area is a recognition result of the person in the image.

The present disclosure is not limited to the details of the above-described exemplary embodiments, and the present disclosure can be embodied in other specific forms without departing from the spirit or essential characteristics of the present disclosure. Therefore, the embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be repaired, or some of the technical mapped features can be equivalently substituted, and that these modifications or substitutions are not to detract from the essence of the technical solutions or from the scope of the technical solutions of the embodiments of the present disclosure.

What is claimed is:

1. A method for recognizing a human body area in an image, the method is applied in an electronic device, the electronic device is applied in a vehicle, the electronic device communicates with a camera, the method comprising:

training a preset neural network model based on one or more of a long-short term memory (LSTM), a recurrent neural network (RNN) and a convolutional neural network (CNN);

recognizing, by the preset neural network model, a human body area corresponding to a person in an image acquired by the camera;

dividing the human body area into a plurality of target areas according to a height of the human body area and a preset height ratio, comprising: dividing the human body area into a first target area, a second target area and a third target area according to the height of the human body area and the preset height ratio; wherein a height of the first target area is less than a height of the second target area and a height of the third target area; the height of the second target area is larger than the height of the third target area;

acquiring a plurality of widths corresponding to the plurality of the target areas, and determining a first target width change relationship;

in response that the first target width change relationship is determined to not match a preset standard width change relationship, determining the human body area is incomplete, comprising: acquiring a width of the first target area, a width of the second target area and a width of the third target area; in response that the width of the first target area is greater than or equal to the width of the second target area, and the width of the first target area is greater than the width of the third target area, determining the first target width change relationship does not match the preset standard width change relationship;

repairing the human body area by using a preset depth learning model;

dividing the repaired human body area into a plurality of expected areas according to a height of the repaired human body area and the preset height ratio;

acquiring a plurality of widths corresponding to the plurality of the expected areas, and determining a second target width change relationship;

in response to the second target width change relationship is determined to match the standard width change relationship, determining that the repaired human body area is a recognition result of the person in the image;

controlling the vehicle according to the recognition result of the person in the image.

2. The method according to claim 1, after determining that the human body area is incomplete, the method further comprising:

in response to the second target width change relationship is determined not matching the standard width change relationship, determining the human body area is a recognition result of the person in the image.

3. The method according to claim 1, wherein the standard width change relationship is determined by:

acquiring test images of a plurality of testers;

inputting each test image into a preset recognition model to obtain a human body area of each tester;

dividing the human body area of each tester, taking an area corresponding to a head of each tester as a first test area, taking an area corresponding to an upper body of each tester as a second test area, and taking an area corresponding to a lower body of each tester as a third test area;

acquiring a width of the first test area, a width of the second target area and a width of the third test area;

determining the standard width change relationship, based on the width of the first test area, the width of the second target area and the width of the third test area.

4. The method according to claim 1, wherein dividing the repaired human body area into a plurality of expected areas according to a height of the repaired human body area and the preset height ratio comprises:

dividing the repaired human body area into a first expected area, a second expected area and a third expected area according to the height of the repaired human body area and the preset height ratio;

wherein a height of the first expected area is less than a height of the second expected area and a height of the third expected area; and the height of the second expected area is larger than the height of the third expected area.

5. The method according to claim 4, further comprising:

acquiring a width of the first expected area, a width of the second expected area and a width of the third expected area;

in response that the width of the first expected area is less than the width of the second expected area, and the width of the second expected area is greater than the width of the third expected area, determining that the second target width change relationship matches the preset standard width change relationship.

6. An electronic device, comprising:

a storage device and a processor, the storage device stores at least one computer-readable instruction, which when executed by the processor causes the processor to:

train a preset neural network model based on one or more of a long-short term memory (LSTM), a recurrent neural network (RNN) and a convolutional neural network (CNN);

recognize, by the preset neural network model, a human body area corresponding to a person in an image acquired by the camera;

divide the human body area into a plurality of target areas according to a height of the human body area and a preset height ratio, comprising: divide the human body area into a first target area, a second target area and a third target area according to the height of the human body area and the preset height ratio; wherein a height of the first target area is less than a height of the second target area and a height of the third target area; the height of the second target area is larger than the height of the third target area;

acquire a plurality of widths corresponding to the plurality of the target areas, and determine a first target width change relationship;

in response that the first target width change relationship is determined to not match a preset standard width change relationship, determine the human body area is incomplete, comprising: acquire a width of the first target area, a width of the second target area and a width of the third target area; in response that the width of the first target area is greater than or equal to the width of the second target area, and the width of the first target area is greater than the width of the third target area, determine the first target width change relationship does not match the preset standard width change relationship;

repair the human body area;

divide the repaired human body area into a plurality of expected areas according to a height of the repaired human body area and the preset height ratio;

acquire a plurality of widths corresponding to the plurality of the expected areas, and determining a second target width change relationship;

in response to the second target width change relationship is determined to match the standard width change relationship, determine that the repaired human body area is a recognition result of the person in the image;

control the vehicle according to the recognition result of the person in the image.

7. The electronic device according to claim 6, after determining that the human body area is incomplete, the processor further to:

in response to the second target width change relationship is determined not matching the standard width change relationship, determine the human body area is a recognition result of the person in the image.

8. The electronic device according to claim 6, wherein the standard width change relationship is determined by:

acquiring test images of a plurality of testers;

inputting each test image into a preset recognition model to obtain a human body area of each tester;

dividing the human body area of each tester, taking an area corresponding to a head of each tester as a first test area, taking an area corresponding to an upper body of each tester as a second test area, and taking an area corresponding to a lower body of each tester as a third test area;

acquiring a width of the first test area, a width of the second target area and a width of the third test area;

determining the standard width change relationship, based on the width of the first test area, the width of the second target area and the width of the third test area.

9. The electronic device according to claim 6, wherein dividing the repaired human body area into a plurality of expected areas according to a height of the repaired human body area and the preset height ratio comprises:

dividing the repaired human body area into a first expected area, a second expected area and a third expected area according to the height of the repaired human body area and the preset height ratio;

wherein a height of the first expected area is less than a height of the second expected area and a height of the third expected area; the height of the second expected area is larger than the height of the third expected area.

10. The electronic device according to claim 9, the processor further to:

acquire a width of the first expected area, a width of the second expected area and a width of the third expected area;

in response that the width of the first expected area is less than the width of the second expected area, and the width of the second expected area is greater than the width of the third expected area, determine the second target width change relationship matches the preset standard width change relationship.

11. A non-transitory storage medium having stored thereon at least one computer-readable instructions that, when the at least one computer-readable instructions are executed by a processor to implement a method for recognizing human body area in image, which comprises:

training a preset neural network model based on one or more of a long-short term memory (LSTM), a recurrent neural network (RNN) and a convolutional neural network (CNN);

recognizing, by the preset neural network model, a human body area corresponding to a person in an image acquired by the camera;

dividing the human body area into a plurality of target areas according to a height of the human body area and a preset height ratio, comprising: dividing the human body area into a first target area, a second target area and a third target area according to the height of the human body area and the preset height ratio; wherein a height of the first target area is less than a height of the second target area and a height of the third target area;

the height of the second target area is larger than the height of the third target area;

acquiring a plurality of widths corresponding to the plurality of the target areas, and determining a first target width change relationship;

in response that the first target width change relationship is determined to not match a preset standard width change relationship, determining the human body area is incomplete, comprising: acquiring a width of the first target area, a width of the second target area and a width of the third target area; in response that the width of the first target area is greater than or equal to the width of the second target area, and the width of the first target area is greater than the width of the third target area, determining the first target width change relationship does not match the preset standard width change relationship;

repairing the human body area;

dividing the repaired human body area into a plurality of expected areas according to a height of the repaired human body area and the preset height ratio;

acquiring a plurality of widths corresponding to the plurality of the expected areas, and determining a second target width change relationship;

in response to the second target width change relationship is determined to match the standard width change relationship, determining that the repaired human body area is a recognition result of the person in the image;

controlling the vehicle according to the recognition result of the person in the image.

12. The non-transitory storage medium according to claim 11, after determining that the human body area is incomplete, wherein the method further comprises:

in response to the second target width change relationship is determined not matching the standard width change relationship, determining the human body area is a recognition result of the person in the image.

13. The non-transitory storage medium according to claim 11, wherein the standard width change relationship is determined by:

acquiring test images of a plurality of testers;

inputting each test image into a preset recognition model to obtain a human body area of each tester;

dividing the human body area of each tester, taking an area corresponding to a head of each tester as a first test area, taking an area corresponding to an upper body of each tester as a second test area, and taking an area corresponding to a lower body of each tester as a third test area;

acquiring a width of the first test area, a width of the second target area and a width of the third test area;

determining the standard width change relationship, based on the width of the first test area, the width of the second target area and the width of the third test area.

14. The non-transitory storage medium according to claim 11, wherein dividing the repaired human body area into a plurality of expected areas according to a height of the repaired human body area and the preset height ratio comprises:

dividing the repaired human body area into a first expected area, a second expected area and a third expected area according to the height of the repaired human body area and the preset height ratio;

wherein a height of the first expected area is less than a height of the second expected area and a height of the third expected area; the height of the second expected area is larger than the height of the third expected area.

* * * * *